July 16, 1940.  G. E. ROSS  2,208,518
CLUTCH
Filed Nov. 2, 1939
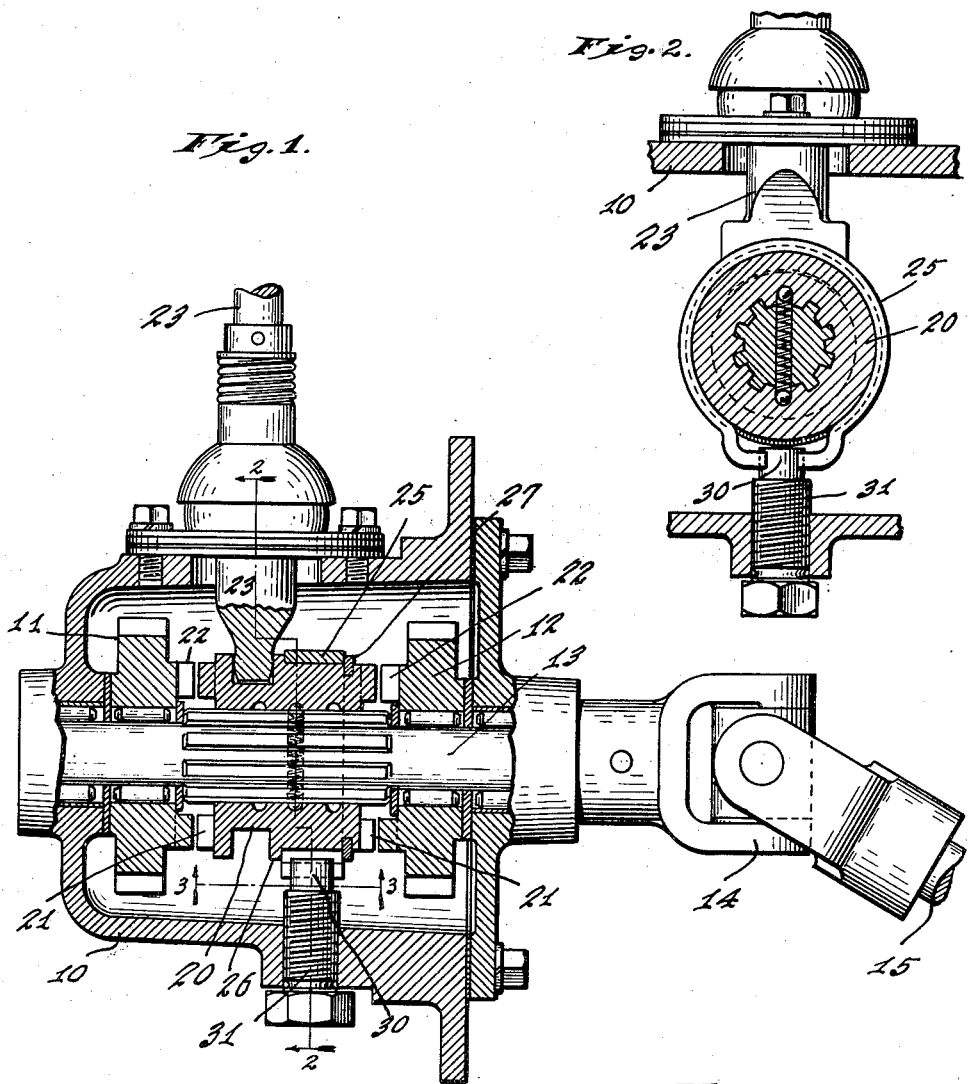
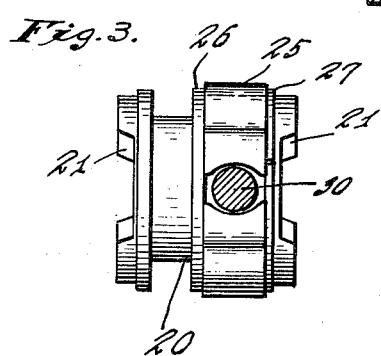
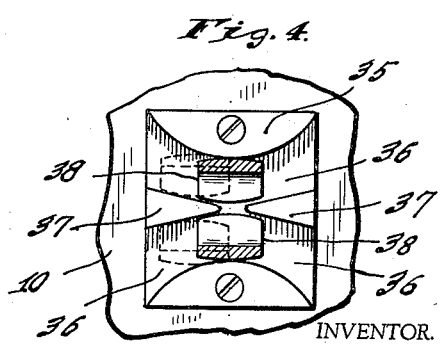
INVENTOR.
GEORGE E. ROSS,
BY
ATTORNEYS.

Patented July 16, 1940

2,208,518

UNITED STATES PATENT OFFICE 2,208,518

CLUTCH

George E. Ross, Indianapolis, Ind., assignor to J. D. Adams Manufacturing Company, Indianapolis, Ind., a corporation of Indiana Application November 2, 1939, Serial No. 302,513

7 Claims. (Cl. 192—4)

My invention relates to clutches of the type employed to interconnect a rotatable driven member with a source of power and has for its primary object the provision of brake means which will prevent rotation of the driven member when it is not connected with the source of power and which will automatically be released when the source of power is connected to the driven means. A further object of my invention is to produce a brake means of this type which will be simple in construction, sufficiently positive in operation, and economical to manufacture.

In carrying out my invention I mount on a rotatable driven element a clutch member which rotates with the driven element but which can be moved axially thereof into or out of engagement with a driving member. Upon this axially movable clutch member I dispose a brake band which is axially movable with such clutch member and is normally in resilient gripping engagement therewith. The ends of this brake band and a co-operating stationary member have interengaging cam faces which operate to spread the ends of the band apart and release its grip on the movable clutch member when the latter is moved into engagement with the driving member.

The accompanying drawing illustrates my invention:

Fig. 1 is an axial section through a clutch embodying my neutral brake; Fig. 2 is a transverse section on the line 2—2 of Fig. 1; Fig. 3 is a bottom plan view of the clutch member and its associated brake band; and Fig. 4 is a fragmental view illustrating a modification of my invention.

In the drawing, I have illustrated the invention as associated with power-operated means for controlling the adjustment of a road-grader blade of the type set forth in the Cost Patent No. 2,064,375. That mechanism comprises a casing 10 in which a plurality of pairs of alined gears 11 and 12 are mounted, only one pair of such gears being shown in the drawing of this application. The gears 11 and 12 are connected with a source of power by means not shown and rotate in opposite directions co-axially with a driven shaft 13 mounted in bearings in opposite side walls of the casing 10. The driven shaft 13 is connected, as by means of the universal joint 14 and shaft 15, with blade-adjusting mechanism which is to be operated in either direction by rotation of the shaft 13.

Between the two gears 11 and 12, there is mounted on the shaft 13 an axially slidable clutch member 20 which is arranged to rotate with the shaft 13 as by being splined thereto. At its opposite ends, the clutch member 20 is provided with two sets of clutch teeth 21 which co-operate with complementary clutch teeth 22 on the inner faces of the gears 11 and 12 respectively. In its neutral position, shown in the drawing, the clutch member 20 is out of engagement with both gears, and the latter are therefore free to rotate relatively to the shaft 13. By moving the clutch member 20 to the left from the position shown in Fig. 1, it and the shaft 13 may be connected to the gear 11 to rotate in one direction, and by moving the clutch member to the right it and the shaft 13 may be connected to rotate with the gear 12 in the opposite direction. A control lever 23 is provided for shifting the clutch member axially in either direction from its neutral position.

Mounted upon the clutch member 20 is a brake band 25 formed so as to have when unstressed an internal diameter somewhat smaller than that of the body of the clutch member upon which it is mounted so that when in place on the clutch member it will grip it frictionally. The brake band 25 is held in place axially of the clutch member between a shoulder or flange 26 on the latter and a split-spring ring 27 disposed in a groove in the clutch member.

The ends of the brake band 25 in the structure illustrated in Figs. 1, 2, and 3 are spaced apart and receive between them a stationary member 30, conveniently the reduced inner end of a screw 31 mounted in the bottom wall of the casing 10. The end surfaces of the material from which the brake band 25 is formed are made concave in shape, as is evident in Fig. 3, so that the space between them will be materially wider at the center of the brake band than near the end faces thereof. Specifically this space is wide enough at the center of the brake band to receive the abutment 30 and narrow enough at each end that when the brake band is moved axially with the clutch member from its neutral position the abutment 30 will spread the ends of the brake band apart and release it from frictional engagement with the clutch member.

The operation of the device will be evident from the construction as described. When the clutch member 20 is in its neutral position and the shaft 13 disconnected from each of the gears 11 and 12, the brake band 25 grips the clutch member 20 frictionally so that relative rotation of the brake band and clutch member is prevented. As the brake band cannot rotate because of the presence of the abutment 30 between its ends, rotation of the shaft 13 is also prevented. However, when the clutch member 20 is moved in either direction from its neutral position into meshing engagement with one or the other of the gears 11 and 12 the abutment 30, entering the narrower portion of the space between the ends of the brake band forces those ends apart, releases the grip of the brake band upon the clutch member, and permits the clutch member and the shaft 13 to rotate. Upon return of the clutch member to neutral position, the resiliency of the brake band 25 causes it again to grip the clutch member and hold it in fixed position.

In the modification of my invention illustrated in Fig. 4, the abutment 30 is eliminated, and there is substituted for it a plate 35 secured to the bottom of the casing 10. In its upper surface, this plate is provided with oppositely curved cam-grooves 36 separated by wedge-like portions 37 of the plate 35. The ends 38 of the brake band 25 are shaped to fit respectively in the grooves 36. In the neutral position of the clutch member 20, the band-ends 38 occupy the positions illustrated in full lines in Fig. 4, lying in those portions of the grooves 36 which are closest together. In this condition, the brake band resiliently grips the clutch member 20 as before. However, when the clutch member is moved from its neutral position into engagement with one or the other of the gears 11 and 12, the band-ends 38 move along the slots 36, as to the dotted-line position illustrated in Fig. 4, and are forced apart by one or the other of the wedges 37 to release the grip of the brake-band on the clutch member and to permit free rotation of the latter.

The construction illustrated in Fig. 4 has an advantage over that illustrated in Fig. 3 in that the reaction between the brake-band ends and the stationary abutment with which each cooperates when the clutch member is in its neutral position is in a direction tending to tighten the brake band on the clutch member; whereas in Fig. 3, the reaction of the abutment 30 on the brake band tends to loosen the latter. As a result, a brake band associated with a fixed abutment of the type illustrated in Fig. 4 may be somewhat lighter than the brake band required by the structure shown in Figs. 1 to 3, although I have found no difficulty in securing the desired results with the construction illustrated in Fig. 3.

I claim as my invention:

1. In combination, a rotatable shaft, a pair of axially spaced gears mounted on said shaft for rotation relatively thereto, means for rotating said gears in opposite directions, a clutch member mounted on said shaft between said gears, said clutch member being rotatable with said shaft but slidable therealong from a neutral position in opposite directions into clutching engagement with the respective gears, a non-rotatable, unitary brake band encircling and resiliently gripping said clutch member and normally acting to prevent rotation thereof, said brake band being movable axially with said clutch member and having its ends arranged in opposed relation, and stationary means positioned to act between the opposed ends of said brake band to expand it and release its grip on said clutch member as the latter is moved from neutral position into clutching engagement with either of said gears.

2. The invention set forth in claim 1 with the addition that the adjacent surfaces of the opposed ends of said brake band are concave toward each other, said stationary means comprising a pin projecting perpendicularly to said shaft between the concave surfaces of the brake-band ends.

3. The invention set forth in claim 1 with the addition that the ends of said brake band project radially outward, said stationary means comprising a plate provided with two grooves in which said brake-band ends are respectively received and guided as said clutch member is moved axially, said grooves diverging from their midpoints toward their ends.

4. In combination, a rotatable shaft, a rotatable driving clutch member coaxial with said shaft, a driven clutch member rotatable with said shaft but slidable therealong into engagement with said driving clutch member, a non-rotatable unitary brake band encircling and resiliently gripping said driven clutch member and normally acting to prevent rotation thereof, said brake-band being axially movable with said driven clutch member and having its ends arranged in opposed relation, and stationary means positioned to act between the ends of said brake-band and expand it and release its grip on the driven clutch member as the latter is moved from neutral position into engagement with the driving clutch member.

5. The invention set forth in claim 4 with the addition that said stationary means comprises a wedge positioned to co-operate with the adjacent faces of the brake-band ends and force them apart as the driven clutch member is moved toward engagement with the driving clutch member.

6. In combination, a rotatable driving clutch member, a rotatable driven clutch member coaxial therewith, said driven clutch member being axially movable from a neutral position into engagement with said driving clutch member, brake mechanism opposing rotation of said driven clutch member when the latter is in neutral position, said mechanism comprising a brake band encircling and axially movable with said driven clutch member, and means including a stationary element co-operating with said brake mechanism for releasing it when said driven clutch member is moved from neutral position toward engagement with the driving clutch member.

7. The invention set forth in claim 4 with the addition that said stationary means comprises a pin projecting perpendicularly to said shaft between the ends of the brake-band and disposed to be engaged by opposed portions of adjacent surfaces of said brake-band ends, such opposed portions of the surfaces of the brake-band ends being inclined to each other whereby the pin effects a separation of said opposed surface-portions to expand the brake-band as the driven clutch member is moved toward engagement with the driving clutch member.

GEORGE E. ROSS.